United States Patent
Woo Lee et al.

(10) Patent No.: US 12,017,597 B2
(45) Date of Patent: Jun. 25, 2024

(54) CONTROL DEVICE AND METHOD FOR CONTROLLING PASSENGER PROTECTION DEVICE

(71) Applicant: HYUNDAI MOBIS CO., LTD., Seoul (KR)

(72) Inventors: Cheol Woo Lee, Yongin-si (KR); Tae Won Park, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 106 days.

(21) Appl. No.: 17/811,023

(22) Filed: Jul. 6, 2022

(65) Prior Publication Data
US 2023/0158981 A1    May 25, 2023

(30) Foreign Application Priority Data
Nov. 24, 2021    (KR) .................. 10-2021-0163360

(51) Int. Cl.
*B60R 21/0132*    (2006.01)
*B60R 21/00*    (2006.01)
(Continued)

(52) U.S. Cl.
CPC ...... *B60R 21/0132* (2013.01); *B60R 21/0136* (2013.01); *B60R 21/16* (2013.01);
(Continued)

(58) Field of Classification Search
CPC . B60R 21/0132; B60R 21/0136; B60R 21/16; B60R 21/21; B60R 21/213;
(Continued)

(56) References Cited

U.S. PATENT DOCUMENTS 4,819,960 A * 4/1989 Breed ................. B60R 21/0132
73/492
5,065,322 A * 11/1991 Mazur ............... B60R 21/01334
180/282
(Continued)

FOREIGN PATENT DOCUMENTS

DE    101 03 661    8/2002
DE    101 56 648    5/2003
(Continued)

OTHER PUBLICATIONS

German Office Action dated Nov. 5, 2023 issued in DE 10 2022 028 307.5.

*Primary Examiner* — Sizo B Vilakazi
*Assistant Examiner* — Brian R Kirby
(74) *Attorney, Agent, or Firm* — DLA Piper LLP (US)

(57) ABSTRACT

A control device for controlling a passenger protection device for a vehicle includes an input unit configured to receive a first acceleration signal in a first axial direction and a second acceleration signal in a second axial direction which are generated by an acceleration sensor disposed in a side door of a vehicle, a determination unit configured to determine whether a collision has occurred in the side door of the vehicle using at least one of the first acceleration signal and the second acceleration signal, and a control unit configured to control a passenger protection device disposed adjacent to the side door of the vehicle based on a result of determining whether the collision has occurred.

18 Claims, 11 Drawing Sheets

(51) Int. Cl.
*B60R 21/0136* (2006.01)
*B60R 21/16* (2006.01)
*B60R 21/21* (2011.01)
*B60R 21/213* (2011.01)

(52) U.S. Cl.
CPC ............ *B60R 21/21* (2013.01); *B60R 21/213* (2013.01); *B60R 2021/0006* (2013.01); *B60R 2021/0025* (2013.01); *B60R 2021/01322* (2013.01); *B60R 2021/01325* (2013.01)

(58) Field of Classification Search
CPC .... B60R 2021/0006; B60R 2021/0025; B60R 2021/01322; B60R 2021/01325
USPC .......................................................... 701/45
See application file for complete search history.

(56) References Cited

U.S. PATENT DOCUMENTS

| | | | | |
|---|---|---|---|---|
| 5,073,860 A * | 12/1991 | Blackburn | ........ | B60R 21/01334 340/436 |
| 5,322,323 A * | 6/1994 | Ohno | ................ | B60R 21/0132 280/730.2 |
| 5,338,062 A * | 8/1994 | Kiuchi | ................ | B60R 21/0132 180/274 |
| 5,339,242 A * | 8/1994 | Reid | ................ | B60R 21/0132 340/436 |
| 5,428,534 A * | 6/1995 | Wetzel | ................ | B60R 21/0136 180/274 |
| 5,504,379 A * | 4/1996 | Mazur | ................ | B60R 21/0133 340/436 |
| 5,566,974 A * | 10/1996 | Mazur | ................ | B60R 21/0133 280/730.2 |
| 5,587,906 A * | 12/1996 | McIver | ................ | B60R 21/0132 340/436 |
| 5,609,358 A * | 3/1997 | Iyoda | ................ | B60R 21/0133 180/274 |
| 5,692,775 A * | 12/1997 | Foo | ................ | B60R 21/0132 280/735 |
| 5,746,444 A * | 5/1998 | Foo | ................ | B60R 21/01336 340/436 |
| 5,935,182 A * | 8/1999 | Foo | ................ | B60R 21/0132 180/282 |
| 6,005,479 A * | 12/1999 | Ide | ................ | B60R 21/0132 180/282 |
| 6,036,224 A * | 3/2000 | Wachter | ................ | B60R 21/0132 180/282 |
| 6,036,225 A * | 3/2000 | Foo | ................ | B60R 21/0156 701/45 |
| 6,095,554 A * | 8/2000 | Foo | ................ | B60R 21/01336 280/730.2 |
| 6,520,536 B2 * | 2/2003 | Foo | ................ | B60R 21/01336 280/734 |
| 9,725,058 B2 * | 8/2017 | Kaerner | ................ | B60R 21/0133 |
| 2007/0112491 A1 * | 5/2007 | Nicaise | ................ | B60R 21/0132 701/1 |
| 2009/0099734 A1 * | 4/2009 | Le | ................ | B60R 21/0132 701/46 |
| 2013/0035827 A1 * | 2/2013 | Breed | ................ | B60W 40/06 701/45 |
| 2019/0016286 A1 * | 1/2019 | Bartlett | ................ | G07C 5/085 |
| 2021/0284091 A1 * | 9/2021 | Balasubramanian | ... | B60R 22/48 |

FOREIGN PATENT DOCUMENTS

| | | |
|---|---|---|
| DE | 10 2009 029 232 | 3/2011 |
| DE | 10 2013 100 502 | 7/2013 |
| DE | 11 2007 002 666 | 5/2016 |
| JP | 2009101837 A * | 5/2009 |

* cited by examiner

CONTROL DEVICE AND METHOD FOR CONTROLLING PASSENGER PROTECTION DEVICE

CROSS-REFERENCE TO RELATED APPLICATION

This application claims priority to and the benefit of Korean Patent Application No. 10-2021-0163360, filed on Nov. 24, 2021, the disclosure of which is incorporated herein by reference in its entirety.

BACKGROUND

Field of the Invention

Embodiments relate to a control device and a method for controlling a passenger protection device.

Discussion of Related Art

In general, a vehicle is equipped with a passenger protection device which is a safety device in which, in a motor accident, an airbag cushion receives gas from an inflator and expands to protect passengers.

Such a passenger protection device is installed in each part of a vehicle as needed and includes a driver seat airbag mounted in a steering wheel to protect a driver sitting in a driver seat, a passenger seat airbag mounted above a glove box to protect a passenger seated in a passenger seat, a curtain airbag installed along a roof rail to protect a side surface of a passenger, and the like.

Conventionally, an acceleration sensor has been mounted on a B-pillar to detect whether a vehicle collision occurs and deploy a passenger protection device such as an airbag according to a detection result. However, when a collision occurs in a door rather than a B-pillar, it may be difficult to quickly detect the collision. In particular, when a high-speed pole collision occurs in a vehicle door, in some cases, a passenger protection device is not deployed at an appropriate time. In order to solve such problems, conventionally, a pressure sensor has been disposed in a door to deploy a passenger protection device according to a value input from the pressure sensor at the time of a vehicle collision.

Since whether an airbag cushion is deployed is directly related to the life of a passenger, a pressure sensor should be able to accurately detect whether a vehicle collision is a serious collision that requires deployment of the airbag cushion. As a pressure sensor, a pressure sensor installed inside a vehicle body to detect a change in pressure inside the vehicle body due to the deformation of the vehicle body in a vehicle collision and thus detect a vehicle collision state is mainly used.

However, since the pressure sensor itself is expensive, and maintaining pressure of a door is important, there is a problem in that the installation difficulty is high. Therefore, there is a need for a method of solving such problems.

SUMMARY OF THE INVENTION

The present invention is directed to providing a control device and a method for controlling a passenger protection device, which are capable of driving a passenger protection device for a vehicle at an appropriate time using an acceleration sensor disposed in a door of the vehicle.

Objectives solved by embodiments are not limited to the above-described objectives, and other objectives that are not described above may be clearly understood by those skilled in the art through the following specification.

According to an aspect of the present invention, there is provided a control device for controlling a passenger protection device for a vehicle, the control device including an input unit configured to receive a first acceleration signal in a first axial direction and a second acceleration signal in a second axial direction which are generated by an acceleration sensor disposed in a side door of a vehicle, a determination unit configured to determine whether a collision has occurred in the side door of the vehicle using at least one of the first acceleration signal and the second acceleration signal, and a control unit configured to control a passenger protection device disposed adjacent to the side door of the vehicle based on a result of determining whether the collision has occurred.

The determination unit may generate a metric using a plurality of pieces of deformation information calculated from the first acceleration signal and the second acceleration signal and may compare the metric with a threshold set in response to the metric to determine whether the collision has occurred in the side door.

When a first metric generated based on the first acceleration signal is greater than or equal to a first threshold and a second metric generated based on the second acceleration signal is greater than or equal to the first threshold, the determination unit may determine that the collision has occurred in the side door.

When the second metric is greater than or equal to a second threshold, the determination unit may determine that the collision has occurred in the side door.

The second threshold may have a greater value than the first threshold.

Each of the first metric and the second metric may be generated using a first variable corresponding to the displacement information and a second variable corresponding to speed information.

The determination unit may determine a collision type between the vehicle and an external object using the first acceleration signal and the second acceleration signal, and the control unit may control the passenger protection device disposed adjacent to the side door of the vehicle based on a result of determining the collision type.

When a third metric generated based on the first acceleration signal and the second acceleration signal is greater than or equal to a third threshold, the determination unit may determine the collision type to be a first collision type, and when the third metric is less than the third threshold, the determination unit may determine the collision type to be a second collision type.

The determination unit may generate a fourth metric using first stiffness information generated based on the first acceleration signal and the plurality of pieces of deformation information, may generate a fifth metric using second stiffness information generated based on the second acceleration signal and the plurality of pieces of deformation information, when the fourth metric is greater than or equal to a preset fourth threshold and the fifth metric is greater than or equal to a preset fifth threshold, may determine the collision type to be a first collision type, and when the fourth metric is less than the fourth threshold or the fifth metric is less than the fifth threshold, may determine the collision type to be a second collision type.

The first collision type may be a pole collision, and the second collision type may be a moving deformable barrier (MDB) collision.

According to an aspect of the present invention, there is provided a method of controlling a passenger protection device for a vehicle, the method including receiving a first acceleration signal in a first axial direction and a second acceleration signal in a second axial direction which are generated by an acceleration sensor disposed in a side door of a vehicle, determining whether a collision has occurred in the side door of the vehicle using at least one of the first acceleration signal and the second acceleration signal, and controlling a passenger protection device disposed adjacent to the side door of the vehicle based on a result of determining whether the collision has occurred.

The determining of whether the collision has occurred may include generating a metric using a plurality of pieces of deformation information calculated from the first acceleration signal and the second acceleration signal, and comparing the metric with a threshold set in response to the metric to determine whether the collision has occurred in the side door.

The determining of whether the collision has occurred may include, when a first metric generated based on the first acceleration signal is greater than or equal to a first threshold and a second metric generated based on the second acceleration signal is greater than or equal to the first threshold, determining that the collision has occurred in the side door.

The determining of whether the collision has occurred may include, when the second metric is greater than or equal to a second threshold, determining that the collision has occurred in the side door.

The second threshold may have a greater value than the first threshold.

Each of the first metric and the second metric may be generated using a first variable corresponding to the displacement information and a second variable corresponding to speed information.

The method may include determining a collision type between the vehicle and an external object using the first acceleration signal and the second acceleration signal, and controlling the passenger protection device disposed adjacent to the side door of the vehicle based on a result of determining the collision type.

The determining of the collision type may include, when a third metric generated based on the first acceleration signal and the second acceleration signal is greater than or equal to a third threshold, determining the collision type to be a first collision type, and when the third metric is less than the third threshold, determining the collision type to be a second collision type.

The determining of the collision type may include generating a fourth metric using first stiffness information generated based on the first acceleration signal and the plurality of pieces of deformation information, generating a fifth metric using second stiffness information generated based on the second acceleration signal and the plurality of pieces of deformation information, when the fourth metric is greater than or equal to a preset fourth threshold and the fifth metric is greater than or equal to a preset fifth threshold, determining the collision type to be a first collision type, and when the fourth metric is less than the fourth threshold or the fifth metric is less than the fifth threshold, determining the collision type to be a second collision type.

The first collision type may be a pole collision, and the second collision type may be an MDB collision.

DETAILED DESCRIPTION OF EXEMPLARY EMBODIMENTS

While the present invention is open to various modifications and alternative embodiments, specific embodiments thereof will be described and shown by way of example in the accompanying drawings. However, it should be understood that there is no intention to limit the present invention to the particular embodiments disclosed, and on the contrary, the present invention is to cover all modifications, equivalents, and alternatives falling within the spirit and scope of the present invention.

It should be understood that, although terms including ordinal numbers such as "first," "second," and the like may be used herein to describe various elements, the elements are not limited by the terms. These terms are only used for the purpose of distinguishing one element from another element. For example, without departing from the scope of the present invention, a second element could be termed a first element, and similarly a first element could be also termed a second element. The term "and/or" includes any one or all combinations of a plurality of associated listed items.

In the case that one component is described as being "connected" or "linked" to another component, it may be connected or linked to the corresponding component directly or other components may be present therebetween. On the other hand, in the case that one component is described as being "directly connected" or "directly linked" to another component, it should be understood that other components are not present therebetween.

It is to be understood that terms used herein are for the purpose of the description of particular embodiments and not for limitation. A singular expression includes a plural expression unless the context clearly indicates otherwise. It will further be understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless defined otherwise, all the terms (including technical and scientific terms) used herein have the same meaning as commonly understood by one of ordinary skill in the art to which the present invention belongs. It will further be understood that terms such as those defined in commonly used dictionaries should be interpreted as having meanings that are consistent with their meanings in the context of the relevant art and should not be interpreted in an idealized or overly formal sense unless expressly defined otherwise herein.

Hereinafter, embodiments will be described in detail with reference to the accompanying drawings, and the same or corresponding elements will be given the same reference numbers throughout the drawings, and redundant descriptions will be omitted.

Figure 1:
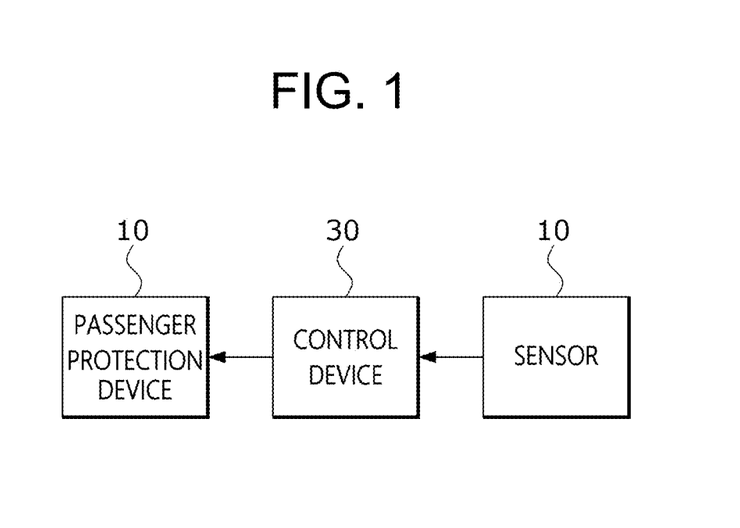
FIG. 1 is a view illustrating a system for controlling a passenger protection device for a vehicle according to an embodiment of the present invention.

FIG. 1 is a view illustrating a system for controlling a passenger protection device for a vehicle according to an embodiment of the present invention.

According to the embodiment of the present invention, the system for controlling a passenger protection device for a vehicle may include a passenger protection device 10, a sensor 20, and a control device 30.

The passenger protection device 10 is a protection device for protecting a driver, a passenger, and the like in a vehicle when an accident such as a collision with an external object occurs. According to one embodiment, the passenger protection device 10 may include an airbag device disposed in front of/beside a seat of a vehicle. According to one embodiment, the passenger protection device 10 may include a seat belt passenger protection device 10 or the like disposed in a seat. The passenger protection device 10 may be referred to as a passenger restraint device or the like.

The sensor 20 may be an acceleration sensor. The sensor 20 may be an acceleration sensor that outputs two-axis values of an x axis and a y axis. The sensor 20 may be disposed in a door of the vehicle. In one embodiment, the sensor 20 may be disposed in at least one of a door at a driver seat side and a door at a passenger seat side in the vehicle. The sensor 20 may be disposed to measure acceleration signals in a left-right direction and a front-rear direction of the vehicle. The sensor 20 may be disposed to output the acceleration signal in the left-right direction of the vehicle as an x-axis acceleration signal. The sensor 20 may be disposed to output the acceleration signal in the front-rear direction of the vehicle as a y-axis acceleration signal.

The control device 30 may be a device that controls the passenger protection device 10 based on an output signal of the sensor 20. The control device 30 may be a device that receives an acceleration signal from the sensor 20 disposed in the door of the vehicle and controls the driving of the passenger protection device 10 based on the acceleration signal. The control device 30 may determine whether a collision has occurred in a side surface of the vehicle based on the received acceleration signal and may control the passenger protection device 10 based on a determination result. The control device 30 may determine a collision type occurring in the side surface of the vehicle based on the received acceleration signal and may control the passenger protection device 10 based on the determined collision type.

When a high-speed collision occurs in the side surface of the vehicle, a pressure sensor 20 may be used to deploy the passenger protection device 10 such as an airbag at an appropriate time, but as described above, in the present invention, when a side collision occurs, the acceleration sensor 20 may be used to control the passenger protection device 10. Accordingly, in the present invention, a method of deploying a passenger protection device 10 at an appropriate time using an acceleration signal will be described in detail below.

Figure 2:
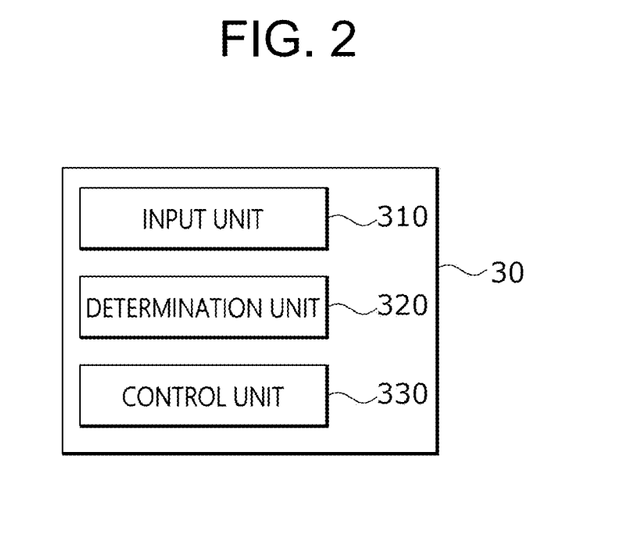
FIG. 2 is a configuration diagram illustrating a control device for controlling a passenger protection device for a vehicle in detail according to an embodiment of the present invention.

FIG. 2 is a configuration diagram illustrating a control device for controlling a passenger protection device for a vehicle in detail according to an embodiment of the present invention.

Referring to FIG. 2, a control device 30 for controlling a passenger protection device according to the embodiment of the present invention includes an input unit 310, a determination unit 320, and a control unit 330.

The input unit 310 may receive a signal output from a sensor. The input unit 310 may receive a first acceleration signal in a first axial direction and a second acceleration signal in a second axial direction which are generated by an acceleration sensor disposed in a side door of a vehicle. Here, the first axis may be an axis in an x-axis direction that is a left-right direction of the vehicle, and the second axis may be an axis in a y-axis direction that is a front-rear direction of the vehicle.

The determination unit 320 may determine whether a collision occurs in a side door based on an input acceleration signal. The determination unit 320 may determine whether a collision has occurred in the side door of the vehicle using at least one of the first acceleration signal and the second acceleration signal. To this end, the determination unit 320 may generate a metric using a plurality of pieces of deformation information calculated from the first acceleration signal and the second acceleration signal. The plurality of pieces of deformation information may include at least one of displacement information, velocity information, and velocity moving sum information. The determination unit 320 may compare the metric with a threshold set in response to the metric to determine whether a collision occurs in the side door. When a first metric generated based on the first acceleration signal is greater than or equal to a first threshold and a second metric generated based on the second acceleration signal is greater than or equal to a first threshold, the determination unit 320 may determine that a collision has occurred in the side door. When the second metric generated based on the second acceleration signal is greater than or equal to a second threshold, the determination unit 320 may determine that a collision has occurred in the side door. In this case, the second threshold may have a greater value than the first threshold. Each of the first metric and the second metric may be generated using a first variable corresponding to the displacement information and a second variable corresponding to the velocity information.

The determination unit 320 may determine whether a collision occurs in the side door based on an input acceleration signal. The determination unit 320 may determine a collision type between the vehicle and an external object using the first acceleration signal and the second acceleration signal. According to one embodiment, when a third metric generated based on the first acceleration signal and the second acceleration signal is greater than or equal to a third threshold, the determination unit 320 may determine the collision type to be a first collision type. When the third metric is less than the third threshold, the determination unit 320 may determine the collision type to be a second collision type. According to one embodiment, the determination unit 320 may generate a fourth metric using first stiffness information generated based on the first acceleration signal and the plurality of pieces of deformation information. The determination unit 320 may generate a fifth metric using second stiffness information generated based on the second acceleration signal and the plurality of pieces of deformation information. When the fourth metric is greater than or equal to a preset fourth threshold and the fifth metric is greater than or equal to a preset fifth threshold, the determination unit 320 may determine the collision type to be the first collision type. When the fourth metric is less than the fourth threshold or the fifth metric is less than the fifth threshold, the determination unit 320 may determine the collision type to be the second collision type. The first collision type may be a pole collision, and the second collision type may be a moving deformable barrier (MDB) collision.

The control unit 330 may control a passenger protection device disposed adjacent to the side door of the vehicle based on a result of determining whether a collision has occurred. In addition, the control unit 330 may control the passenger protection device disposed adjacent to the side door of the vehicle based on a result of determining the collision type.

Figure 3:
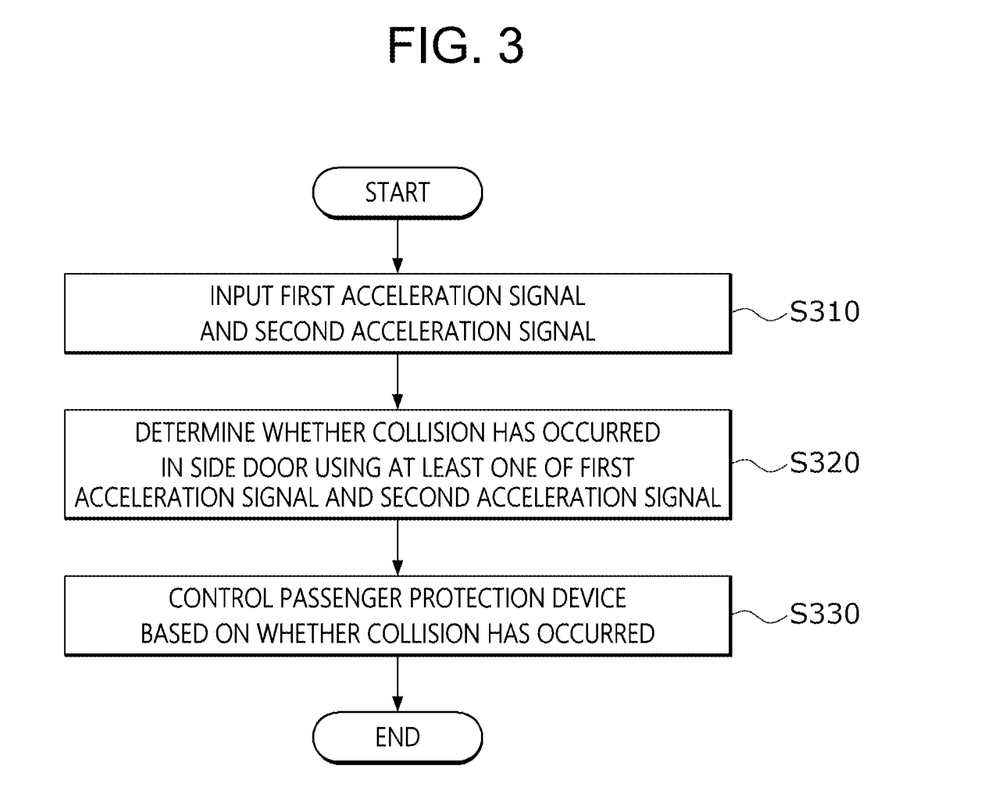
FIG. 3 is a flowchart of a method of controlling a passenger protection device for a vehicle according to an embodiment of the present invention.

FIG. 3 is a flowchart of a method of controlling a passenger protection device for a vehicle according to one embodiment of the present invention.

Referring to FIG. 3, first, an input unit 310 may receive a first acceleration signal in a first axial direction and a second acceleration signal in a second axial direction which are generated by an acceleration sensor disposed in a side door of a vehicle (S310).

Next, a determination unit 320 may determine whether a collision has occurred in the side door of the vehicle using at least one of the first acceleration signal and the second acceleration signal (S320).

Specifically, the determination unit 320 may generate a metric using a plurality of pieces of deformation information calculated from the first acceleration signal and the second acceleration signal. The plurality of pieces of deformation information may include at least one of displacement information, velocity information, and velocity moving sum information. The determination unit 320 may compare the metric with a threshold set in response to the metric to determine whether a collision occurs in the side door.

Then, a control unit 330 may control a passenger protection device disposed adjacent to the side door of the vehicle based on a result of determining whether a collision has occurred (S330).

Figure 4:
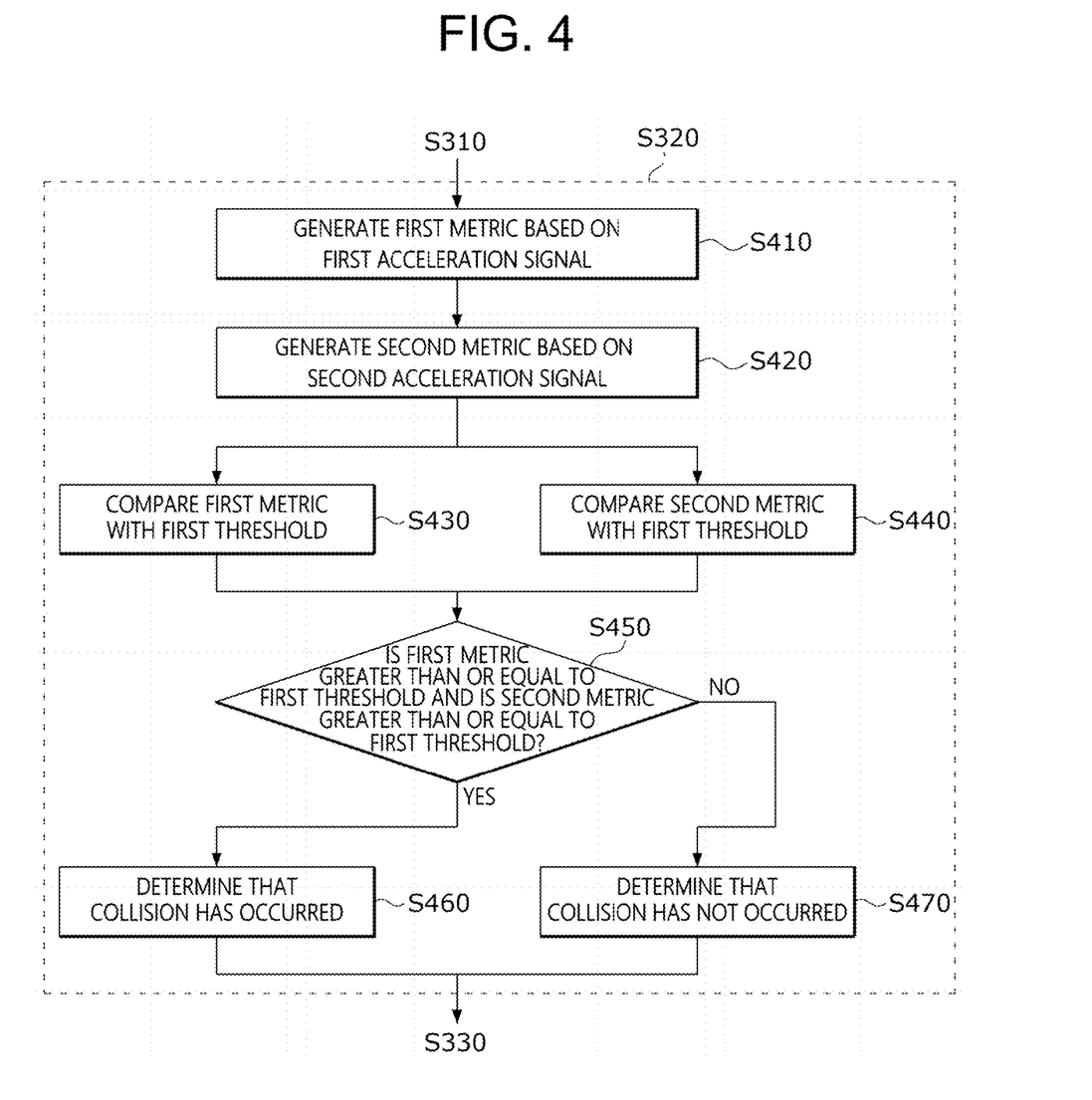
FIG. 4 illustrates operation S320 of FIG. 3 in detail according to one embodiment.

FIG. 4 illustrates operation S320 of FIG. 3 in detail according to one embodiment.

Referring to FIG. 4, the determination unit 320 may generate a first metric based on the first acceleration signal (S410).

The determination unit 320 may generate a second metric based on the second acceleration signal (S420).

Then, the determination unit 320 may compare the first metric with a preset first threshold (S430).

The determination unit 320 may compare the second metric with the preset first threshold (S440).

Next, the determination unit 320 may determine whether both the first metric and the second metric are greater than or equal to the first threshold (S450).

Then, when the first metric generated based on the first acceleration signal is greater than or equal to the first threshold and the second metric generated based on the second acceleration signal is greater than or equal to the first threshold, the determination unit 320 may determine that a collision has occurred in the side door (S460).

On the other hand, when the first metric generated based on the first acceleration signal is less than the first threshold or the second metric generated based on the second acceleration signal is less than the first threshold, the determination unit 320 may determine that a collision has not occurred in the side door (S470).

Figure 5:
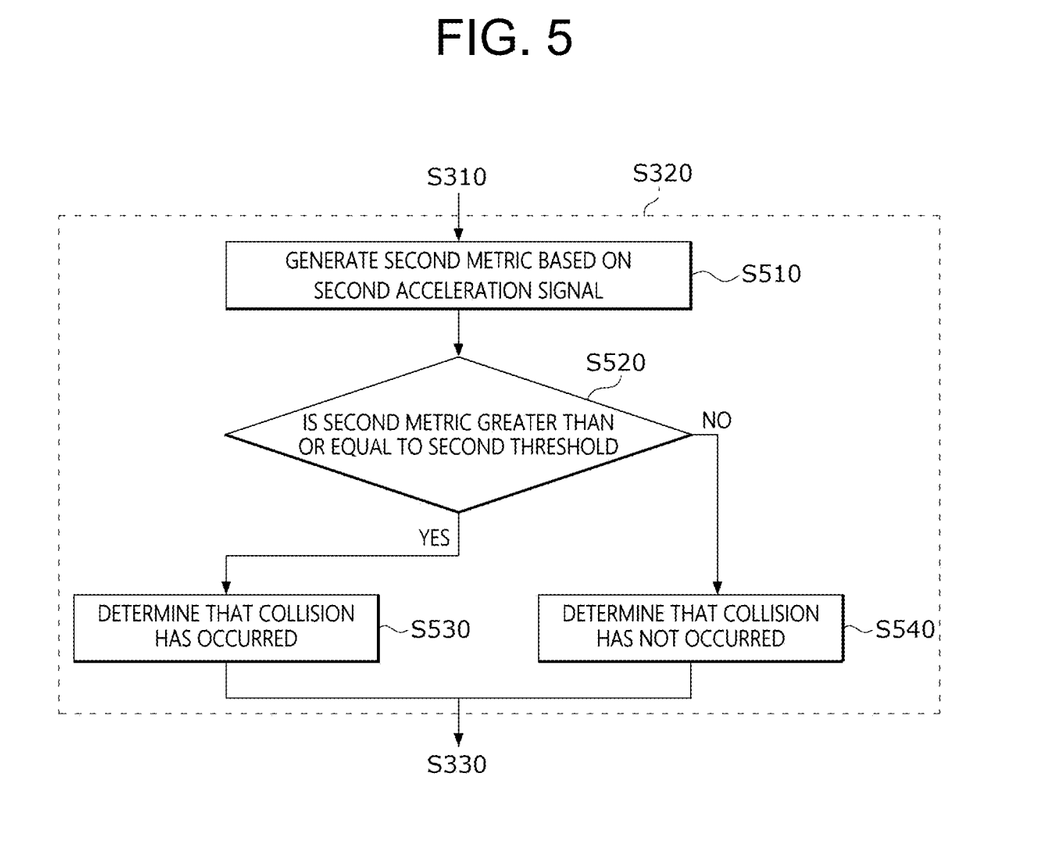
FIG. 5 illustrates operation S320 of FIG. 3 in detail according to another embodiment.

FIG. 5 illustrates operation S320 of FIG. 3 in detail according to another embodiment.

Referring to FIG. 5, the determination unit 320 may generate a second metric based on the second acceleration signal (S510).

Next, the determination unit 320 may compare the second metric with a preset second threshold (S520).

When the second metric generated based on the second acceleration signal is greater than or equal to the second threshold, the determination unit 320 may determine that a collision has occurred in the side door (S530).

On the other hand, when the second metric generated based on the second acceleration signal is less than the second threshold, the determination unit 320 may determine that a collision has not occurred in the side door (S540).

Figure 6:
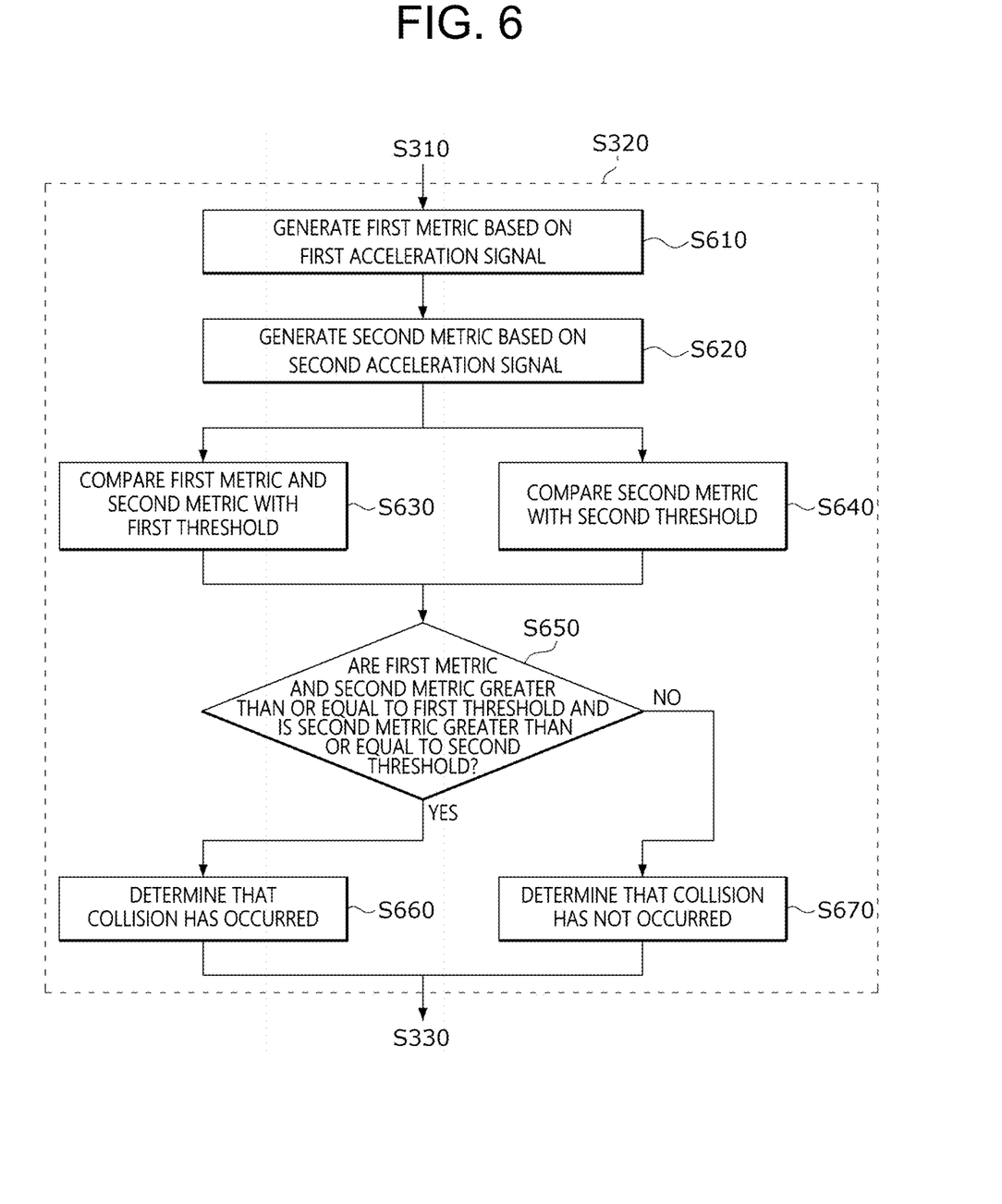
FIG. 6 illustrates operation S320 of FIG. 3 in detail according to still another embodiment.

FIG. 6 illustrates operation S320 of FIG. 3 in detail according to still another embodiment.

Referring to FIG. 6, the determination unit 320 may generate a first metric based on the first acceleration signal (S610).

The determination unit 320 may generate a second metric based on the second acceleration signal (S620).

Then, the determination unit 320 may compare the first metric and the second metric with a preset first threshold (S630).

The determination unit 320 may compare the second metric with a preset second threshold (S640).

Then, the determination unit 320 may determine whether a collision has occurred based on a size comparison result between the first and second metrics and the first threshold and a size comparison result between the second metric and the second threshold (S650).

When the first metric generated based on the first acceleration signal is greater than or equal to the first threshold and the second metric generated based on the second acceleration signal is greater than or equal to the first threshold, the determination unit 320 may determine that a collision has occurred in the side door. Alternatively, when the second metric generated based on the second acceleration signal is greater than or equal to the second threshold, the determination unit 320 may determine that a collision has occurred in the side door (S660).

On the other hand, when the first metric generated based on the first acceleration signal is less than the first threshold, the second metric generated based on the second acceleration signal is less than the first threshold, and the second metric generated based on the second acceleration signal is less than the second threshold, the determination unit 320 may determine that a collision has not occurred in the side door (S670).

That is, whether a collision has occurred in the side door is determined through each of a first condition of comparing the first metric and the second metric with the first threshold and a second condition of comparing the second metric with the second threshold, thereby providing a result in which whether the collision has occurred is determined at high accuracy.

Figure 7A:
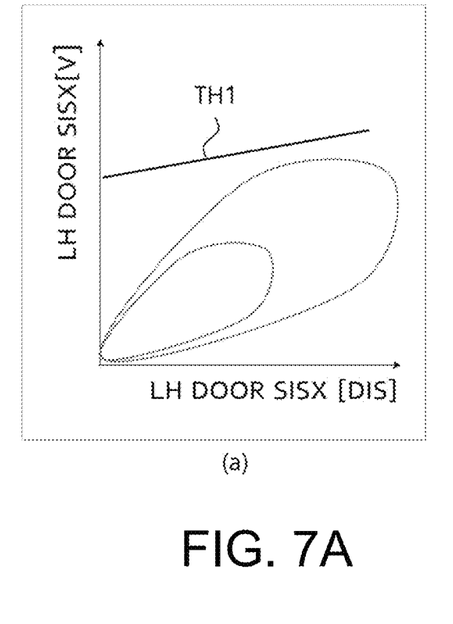
FIGS. 7A and 7B shows graphics for describing a first metric and a second metric according to an embodiment of the present invention.
Figure 7B:
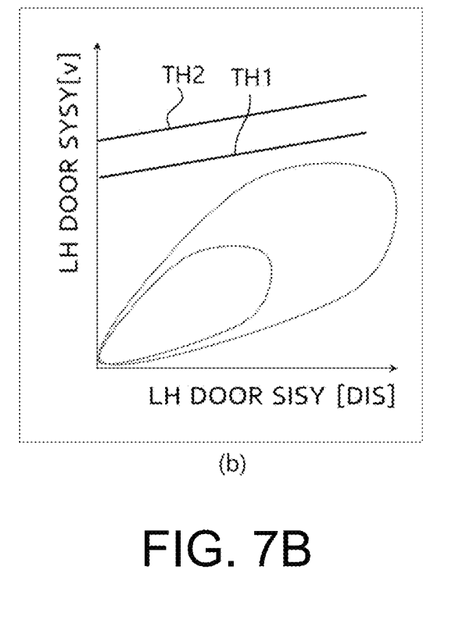

FIGS. 7A and 7B shows graphics for describing a first metric and a second metric according to an embodiment of the present invention.

According to an embodiment of the present invention, a determination unit 320 may generate a metric using deformation information of an acceleration signal. The deformation information may be a signal generated by integrating an acceleration signal or filtering the acceleration signal through a certain filter. For example, the deformation information may include at least one of displacement information, velocity information, and velocity moving sum information which are generated by integrating an acceleration signal.

The determination unit 320 may generate a two-dimensional metric using two pieces of information among deformation information as variables.

In one embodiment, as shown in FIG. 7A, the determination unit 320 may generate the first metric using displacement information generated based on a first acceleration signal on an x axis as a variable and using velocity information generated based on a first acceleration signal on a y axis as a variable.

In another embodiment, as shown in FIG. 7B, the determination unit 320 may generate the second metric using displacement information generated based on a second acceleration signal on an x axis as a variable and using velocity information generated based on a second acceleration signal on a y axis as a variable.

Referring to FIGS. 7A and 7B, a threshold used for comparison with the first metric and the second metric may have a two-dimensional value. As an example, as shown in FIGS. 7A and 7B, the first threshold and the second threshold may have values of straight lines having a certain slope. As shown in FIG. 7A, when all metrics have a value that is less than a threshold having a value of a straight line, the determination unit 320 may determine that a corresponding metric has a value that is less than the threshold. On the other hand, when at least some metrics have a value that is greater than or equal to a threshold having a value of a straight line, the determination unit 320 may determine that a corresponding metric has a value that is greater than or equal to the threshold. Although a threshold is described in the form of a value of a straight line in FIGS. 7A and 7B, the present invention is not limited thereto, and various types of thresholds having two-dimensional values may be set.

Meanwhile, as shown in FIG. 7B, a second threshold TH2 may have a greater value than a first threshold TH1. That is, the second threshold TH2 compared only with the second metric may be set to be greater than the first threshold TH1 that is commonly compared with the first metric and the second metric. Thus, it is possible to control the deployment of a passenger protection device at a more appropriate time.

Figure 8:
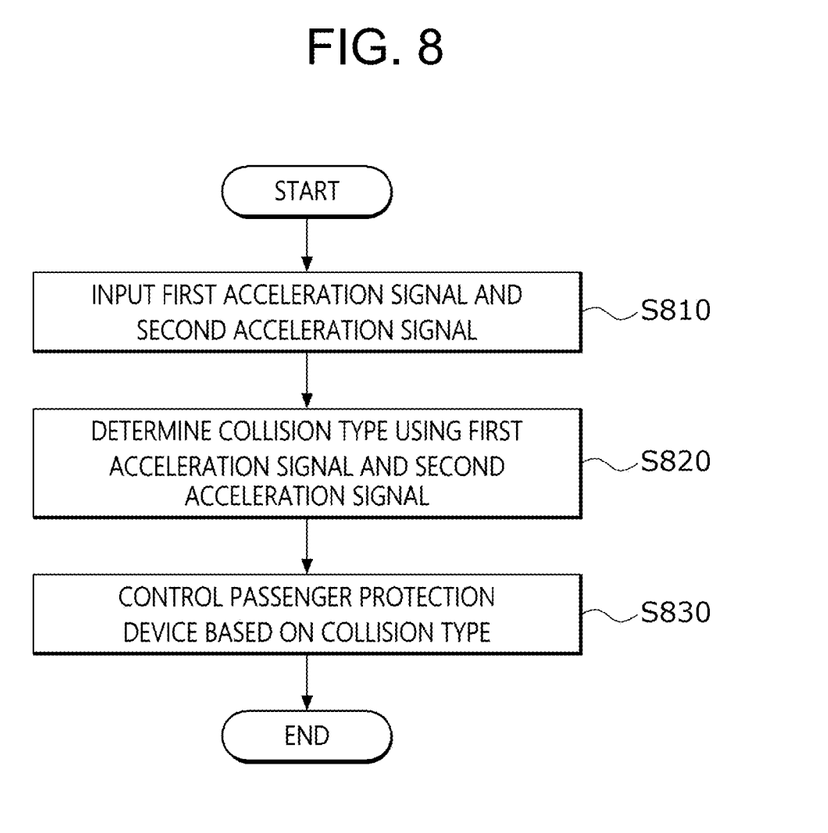
FIG. 8 is a flowchart of a method of controlling a passenger protection device for a vehicle according to another embodiment of the present invention.

FIG. 8 is a flowchart of a method of controlling a passenger protection device for a vehicle according to another embodiment of the present invention.

Referring to FIG. 8, first, an input unit 310 may receive a first acceleration signal in a first axial direction and a second acceleration signal in a second axial direction which are generated by an acceleration sensor disposed in a side door of a vehicle (S810).

The determination unit 320 may determine a collision type between the vehicle and an external object using the first acceleration signal and the second acceleration signal (S820). Specifically, the determination unit 320 may generate a metric using a plurality of pieces of deformation information calculated from the first acceleration signal and the second acceleration signal. The plurality of pieces of deformation information may include at least one of displacement information, velocity information, and velocity moving sum information. The plurality of pieces of information may include stiffness information. The determination unit 320 may compare the metric with a threshold set in response to the metric to determine the collision type of the side door.

The control unit 330 may control a passenger protection device disposed adjacent to the side door of the vehicle based on a result of determining the collision type (S830).

Figure 9:
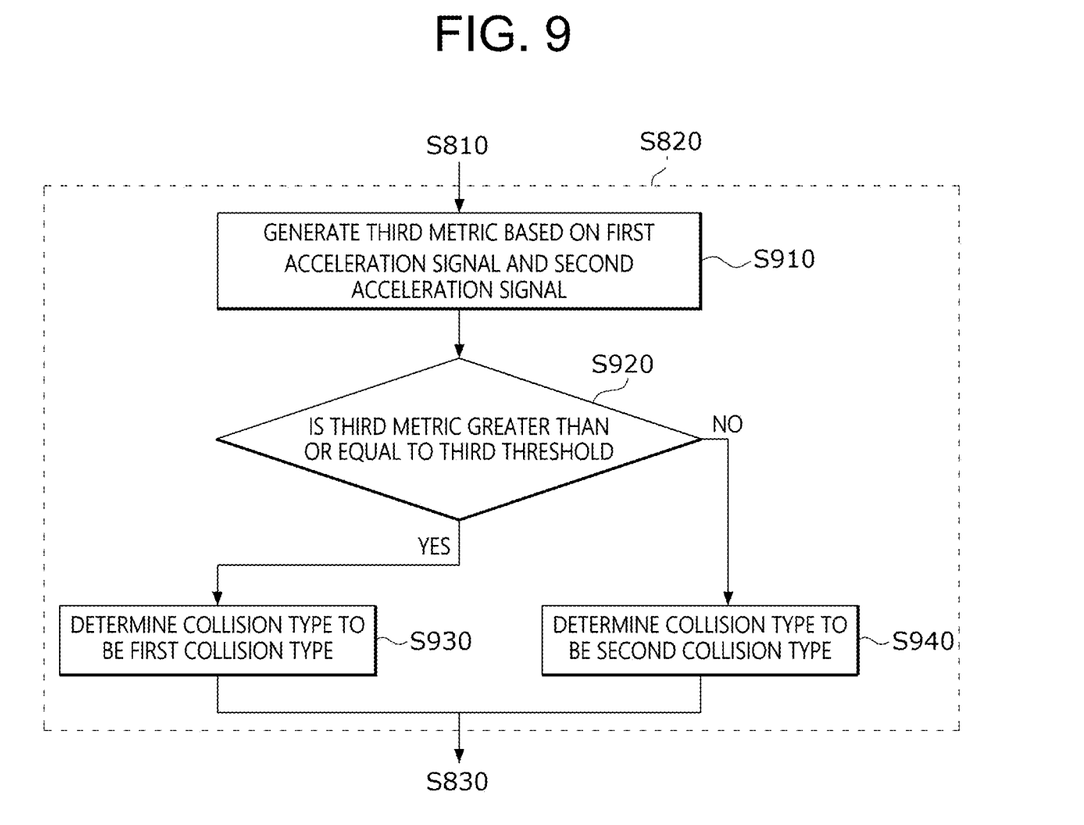
FIG. 9 illustrates operation S820 of FIG. 8 in detail according to one embodiment.

FIG. 9 illustrates operation S820 of FIG. 8 in detail according to one embodiment.

Referring to FIG. 9, first, the determination unit 320 may generate a third metric based on the first acceleration signal and the second acceleration signal (S910).

Next, the determination unit 320 may compare the third metric with a preset third threshold (S920).

When the third metric is greater than or equal to the third threshold, the determination unit 320 may determine the collision type to be a first collision type (S930). The first collision type may be a pole collision.

When the third metric is less than the third threshold, the determination unit 320 may determine the collision type to be a second collision type (S940). The second collision type may be an MDB collision.

Figure 10:
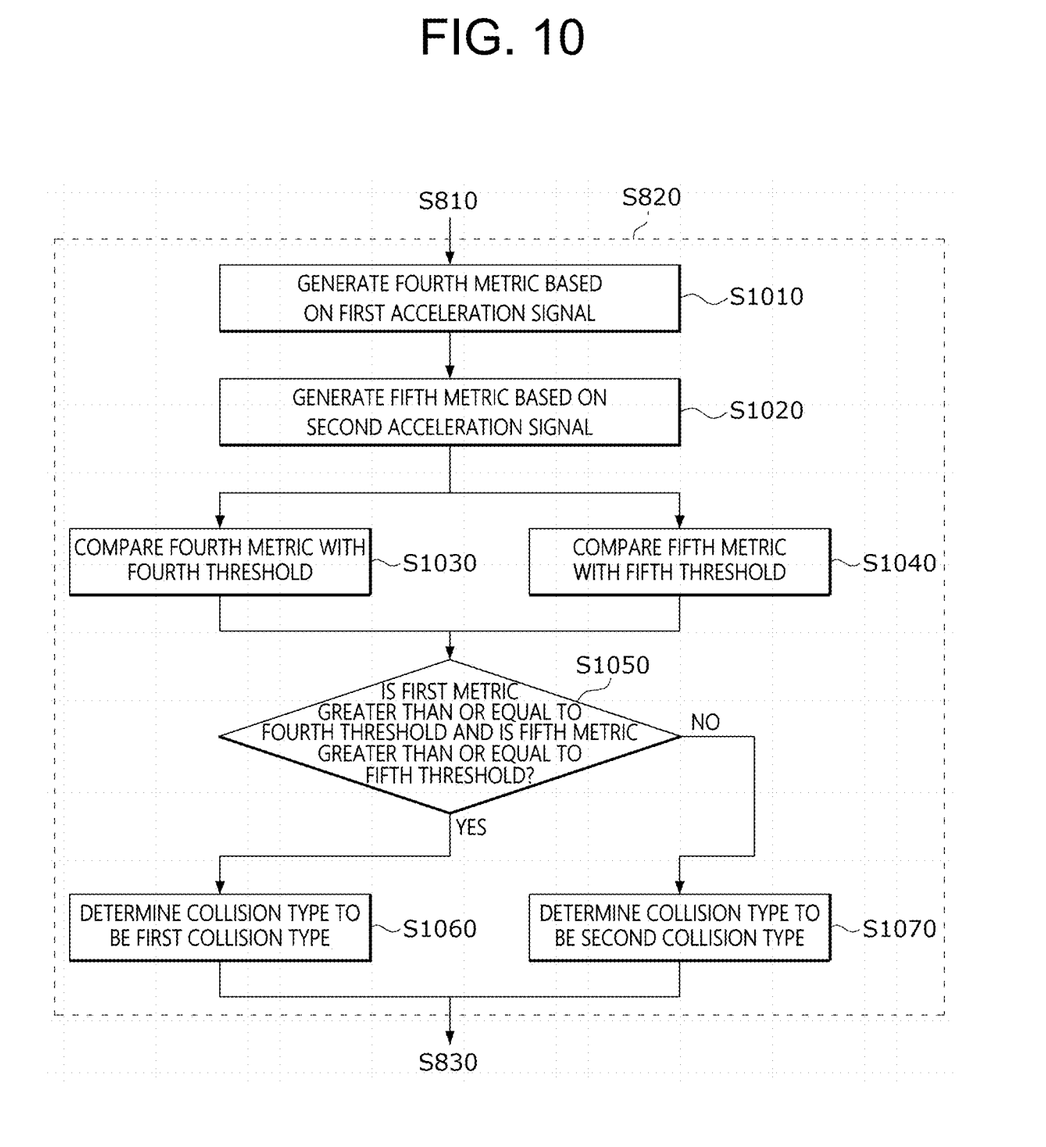
FIG. 10 illustrates operation S820 of FIG. 8 in detail according to still another embodiment.

FIG. 10 illustrates operation S820 of FIG. 8 in detail according to still another embodiment.

Referring to FIG. 10, first, the determination unit 320 may generate a fourth metric based on the first acceleration signal (S1010).

The determination unit 320 may generate a fifth metric based on the second acceleration signal (S1020).

Next, the determination unit 320 may compare the fourth metric with a preset fourth threshold (S1030).

The determination unit 320 may compare the fifth metric with a preset fifth threshold (S1040).

The determination unit may determine whether the fourth metric is greater than or equal to the fourth threshold and the fifth metric is greater than or equal to the fifth threshold (S1050).

When the fourth metric is greater than or equal to the fourth threshold and the fifth metric is greater than or equal to the fifth threshold, the determination unit 320 may determine the collision type to be a first collision type (S1060). The first collision type may be a pole collision.

On the other hand, when the fourth metric is less than the fourth threshold and the fifth metric is less than the fifth threshold, the determination unit 320 may determine the collision type to be a second collision type (S1070). The second collision type may be an MDB collision.

Figure 11A:
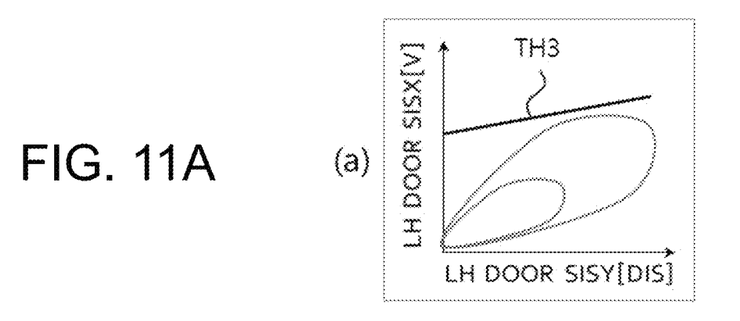
FIGS. 11A, 11B and 11C shows graphics for describing third to fifth metrics according to an embodiment of the present invention.
Figure 11B:
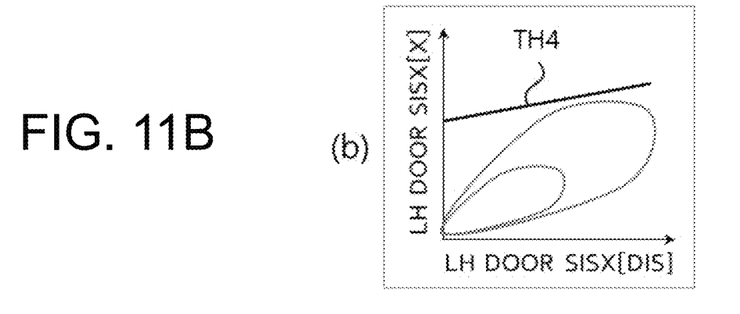
Figure 11C:
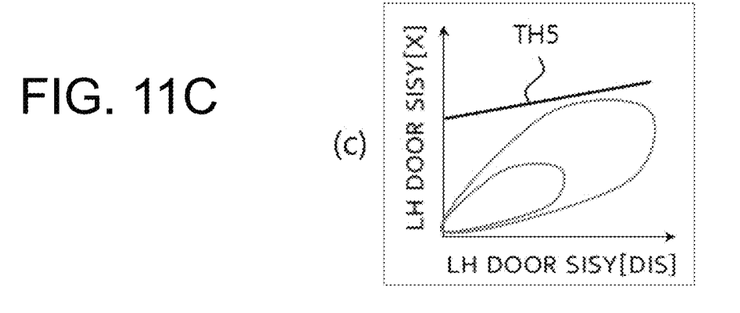

FIGS. 11A, 11B and 11C shows graphics for describing third to fifth metrics according to an embodiment of the present invention.

According to an embodiment of the present invention, a determination unit 320 may generate a metric using deformation information of an acceleration signal. The deformation information may be a signal generated by integrating an acceleration signal or filtering the acceleration signal through a certain filter. For example, the deformation information may include at least one of displacement information, velocity information, and velocity moving sum information which are generated by integrating an acceleration signal. In addition, the deformation information may include stiffness information generated by allowing an acceleration signal to pass through a band pass filter.

The determination unit 320 may generate a two-dimensional metric by using two pieces of information among deformation information as variables.

In one embodiment, as shown in FIG. 11A, the determination unit 320 may generate the third metric using displacement information generated based on a second acceleration signal on an x axis as a variable and using velocity information generated based on a second acceleration signal on a y axis as a variable.

In one embodiment, as shown in FIG. 11B, the determination unit 320 may generate the fourth metric using displacement information generated based on a first acceleration signal on an x axis as a variable and using stiffness information generated based on a first acceleration signal on a y axis as a variable.

In one embodiment, as shown in FIG. 11C, the determination unit 320 may generate the fifth metric using displacement information generated based on a second acceleration signal on an x axis as a variable and stiffness information generated based on a second acceleration signal on a y axis as a variable.

Referring to FIGS. 11A, 11B and 11C, third to fifth thresholds used for comparison with the third to fifth metrics may have a two-dimensional value. As an example, as shown in FIGS. 11A to 11C, the first and second thresholds may have values of straight lines having a certain slope. When all metrics have a value that is less than a threshold having a value of a straight line, the determination unit 320 may determine that a corresponding metric has a value that is less than the threshold. On the other hand, when at least some metrics have a value that is greater than or equal to a threshold having a value of a straight line, the determination unit 320 may determine that a corresponding metric has a value that is greater than or equal to the threshold. Although a threshold is described in the form of a value of a straight line in FIGS. 11A, 11B and 11C, the present invention is not limited thereto, and various types of thresholds having two-dimensional values may be set.

Figure 12:
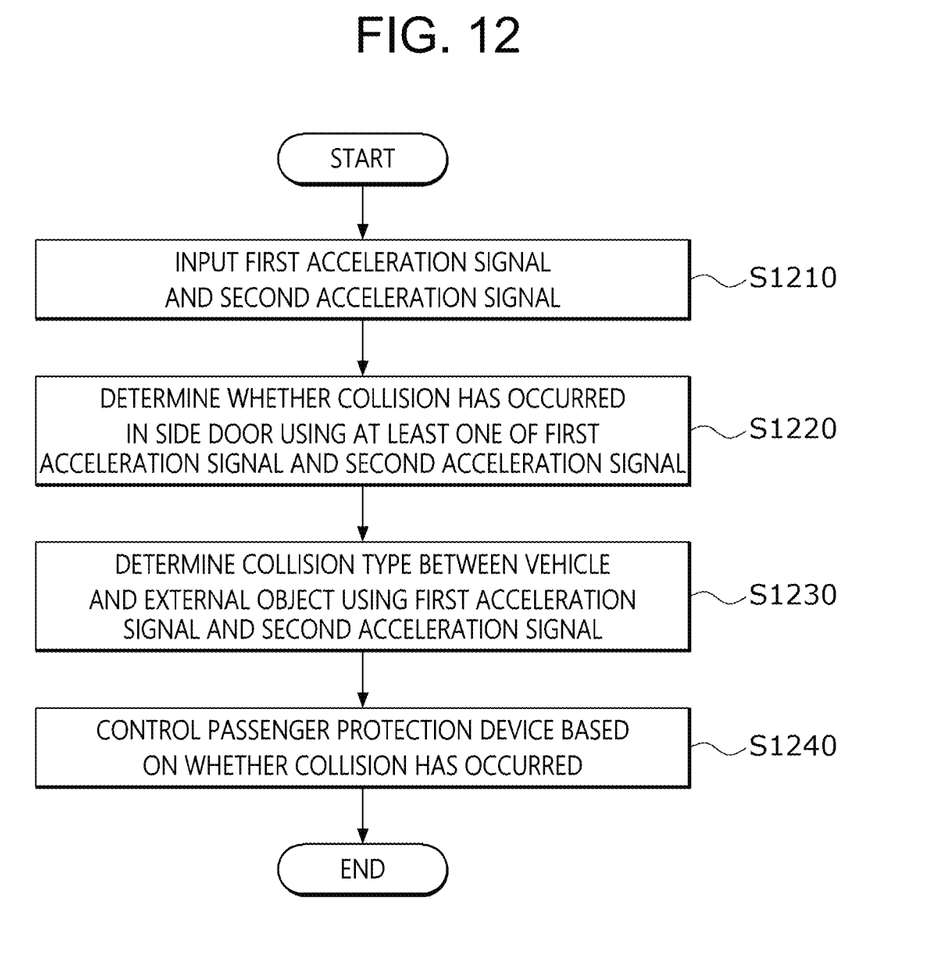
FIG. 12 is a flowchart of a method of controlling a passenger protection device for a vehicle according to still another embodiment of the present invention.

FIG. 12 is a flowchart of a method of controlling a passenger protection device for a vehicle according to still another embodiment of the present invention.

Referring to FIG. 12, first, an input unit 310 may receive a first acceleration signal in a first axial direction and a second acceleration signal in a second axial direction which are generated by an acceleration sensor disposed in a side door of a vehicle (S1210).

Next, a determination unit 320 may determine whether a collision has occurred in the side door of the vehicle using at least one of the first acceleration signal and the second acceleration signal (S1220). Since the corresponding operation has been described above with reference to the drawing, detailed description thereof will be omitted.

The determination unit 320 may determine a collision type between the vehicle and an external object using the first acceleration signal and the second acceleration signal (S1230). Since the corresponding operation has been described above with reference to the drawing, detailed description thereof will be omitted.

The control unit 330 may control a passenger protection device disposed adjacent to the side door of the vehicle based on a result of determining whether a collision has occurred and a result of determining the collision type (S1240).

According to embodiments, since a passenger protection device can be deployed at an appropriate time, there is an advantage in that a passenger protection function can be improved.

According to embodiments, since an acceleration sensor is used rather than a pressure sensor, there is an advantage in that costs and manufacturing difficulties can be reduced.

According to embodiments, since a collision type is identified and an appropriate passenger protection device is driven according to the identified collision type, there is an advantage in that a passenger protection function can be improved.

Various useful advantages and effects of embodiments are not limited to the above-described effects and may be more easily understood from the description of specific embodiments of the present invention.

The term "unit" used in the present embodiment refers to a software or hardware component, such as a field-programmable gate array (FPGA) or an application-specific integrated circuit (ASIC), which executes certain tasks. However, the term "unit" is not limited to the software or hardware component. A "unit" may be configured to reside in an addressable storage medium and configured to operate one or more processors. Thus, a "unit" may include, by way of example, components such as software components, object-oriented software components, class components and task components, processes, functions, attributes, procedures, subroutines, segments of program code, drivers, firmware, microcode, circuitry, data, databases, database structures, tables, arrays, and parameters. The functionality provided in the components and "units" may be combined into fewer components and "units" or further separated into additional components and units. In addition, the components and units may be implemented such that the components and "units" operate one or more central processing units (CPUs) in a device or a security multimedia card.

The present invention has been described based on embodiments, but the embodiments are illustrative and do not limit the present invention, and those skilled in the art will appreciate that various modifications and applications not exemplified in the above description may be made without departing from the scope of the essential characteristics of the present embodiments. For example, each component described in detail in the embodiments can be modified. Further, the differences related to the modification and the application should be construed as being included in the scope of the present invention defined in the appended claims.

What is claimed is:

1. A control device for controlling a passenger protection device for a vehicle, the control device comprising:
   an input unit configured to receive a first acceleration signal for a first axial direction and a second acceleration signal for a second axial direction generated by an acceleration sensor disposed in a side door of the vehicle;
   a determination unit configured to determine whether a collision has occurred at the side door of the vehicle using at least one of the first acceleration signal and the second acceleration signal, wherein the determination unit is configured to generate a metric using one or more deformation information calculated from the first acceleration signal and the second acceleration signal and to compare the metric with a threshold set in response to the metric to determine whether the collision has occurred at the side door,
   wherein the one or more deformation information comprises displacement information, velocity information, and velocity moving sum information; and
   a control unit configured to control the passenger protection device, which is disposed adjacent the side door of the vehicle, based on a result of determining whether the collision has occurred.

2. The control device of claim 1, wherein, when a first metric generated based on the first acceleration signal is greater than or equal to a first threshold and a second metric generated based on the second acceleration signal is greater than or equal to the first threshold, the determination unit is configured to determine that the collision has occurred at the side door.

3. The control device of claim 2, wherein, when the second metric is greater than or equal to a second threshold, the determination unit is configured to determine that the collision has occurred at the side door.

4. The control device of claim 3, wherein the second threshold has a value greater than a value of the first threshold.

5. The control device of claim 3, wherein each of the first metric and the second metric is generated using a first variable corresponding to the deformation information and a second variable corresponding to speed information.

6. The control device of claim 1, wherein:
the determination unit is configured to determine a collision type between the vehicle and an external object using the first acceleration signal and the second acceleration signal; and
the control unit is configured to control the passenger protection device based on the determined collision type.

7. The control device of claim 6, wherein:
when a third metric generated based on the first acceleration signal and the second acceleration signal is greater than or equal to a third threshold, the determination unit is configured to determine the collision type to be a first collision type; and
when the third metric is less than the third threshold, the determination unit is configured to determine the collision type to be a second collision type.

8. The control device of claim 6, wherein the determination unit is configured to:
generate a fourth metric using first stiffness information generated based on the first acceleration signal and one or more deformation information,
generate a fifth metric using second stiffness information generated based on the second acceleration signal and the one or more deformation information,
determine the collision type to be a first collision type when the fourth metric is greater than or equal to a preset fourth threshold and the fifth metric is greater than or equal to a preset fifth threshold, and
determine the collision type to be a second collision type when the fourth metric is less than the fourth threshold or the fifth metric is less than the fifth threshold.

9. The control device of claim 7, wherein:
the first collision type is a pole collision; and
the second collision type is a moving deformable barrier (MDB) collision.

10. A method of controlling a passenger protection device for a vehicle, the method comprising:
receiving a first acceleration signal for a first axial direction and a second acceleration signal for a second axial direction generated by an acceleration sensor disposed in a side door of the vehicle;
determining whether a collision has occurred at the side door of the vehicle using at least one of the first acceleration signal and the second acceleration signal wherein the determining comprises:
generating a metric using one or more deformation information calculated from the first acceleration signal and the second acceleration signal, wherein the one or more deformation information comprises displacement information, velocity information, and velocity moving sum information; and
comparing the metric with a threshold set in response to the metric to determine whether the collision has occurred at the side door; and
controlling the passenger protection device, which is disposed adjacent the side door of the vehicle, based on a result of determining whether the collision has occurred.

11. The method of claim 10, wherein determining whether the collision has occurred includes determining that the collision has occurred at the side door when a first metric generated based on the first acceleration signal is greater than or equal to a first threshold and a second metric generated based on the second acceleration signal is greater than or equal to the first threshold.

12. The method of claim 11, wherein determining whether the collision has occurred includes determining that the collision has occurred at the side door when the second metric is greater than or equal to a second threshold.

13. The method of claim 12, wherein the second threshold has a value greater than a value of the first threshold.

14. The method of claim 12, wherein each of the first metric and the second metric is generated using a first variable corresponding to the deformation information and a second variable corresponding to speed information.

15. The method of claim 10, comprising:
determining a collision type between the vehicle and an external object using the first acceleration signal and the second acceleration signal; and
controlling the passenger protection device based on the determined collision type.

16. The method of claim 15, wherein determining the collision type includes:
determining the collision type to be a first collision type when a third metric generated based on the first acceleration signal and the second acceleration signal is greater than or equal to a third threshold; and
determining the collision type to be a second collision type when the third metric is less than the third threshold.

17. The method of claim 15, wherein determining the collision type includes:
generating a fourth metric using first stiffness information generated based on the first acceleration signal and one or more deformation information;
generating a fifth metric using second stiffness information generated based on the second acceleration signal and the one or more deformation information;
determining the collision type to be a first collision type when the fourth metric is greater than or equal to a preset fourth threshold and the fifth metric is greater than or equal to a preset fifth threshold; and
determining the collision type to be a second collision type when the fourth metric is less than the fourth threshold or the fifth metric is less than the fifth threshold.

18. The method of claim 16, wherein:
the first collision type is a pole collision; and
the second collision type is a moving deformable barrier (MDB) collision.

* * * * *